United States Patent [19]

Katcherian

[11] Patent Number: 5,009,462
[45] Date of Patent: Apr. 23, 1991

[54] WINDOW REVEAL MOLDING

[75] Inventor: Ricky V. Katcherian, Farmington Hills, Mich.

[73] Assignee: General Motors Corporation, Detroit, Mich.

[21] Appl. No.: 401,721

[22] Filed: Sep. 1, 1989

[51] Int. Cl.$^5$ .............................................. B60J 1/00
[52] U.S. Cl. ..................................... 296/201; 296/93; 296/96.21; 52/208; 52/400
[58] Field of Search ..................... 296/93, 96.21, 201, 296/206, 146; 52/208, 397, 400

[56] References Cited

U.S. PATENT DOCUMENTS

| | | | |
|---|---|---|---|
| 3,851,432 | 12/1974 | Griffin | 52/400 |
| 4,165,119 | 8/1979 | Hedeen et al. | 296/93 |
| 4,765,673 | 8/1988 | Frabotta et al. | 296/93 |
| 4,850,640 | 7/1989 | Gold | 296/201 |
| 4,905,432 | 3/1990 | Romie | 296/93 X |

FOREIGN PATENT DOCUMENTS

| | | | |
|---|---|---|---|
| 163720 | 8/1985 | Japan | 296/93 |
| 0132411 | 6/1986 | Japan | 296/93 |
| 0029456 | 2/1987 | Japan | 296/93 |
| 0078810 | 4/1988 | Japan | 296/146 |

Primary Examiner—Dennis H. Pedder
Attorney, Agent, or Firm—Charles E. Leahy

[57] ABSTRACT

A vehicle window molding installation including a molding concealing a space between a flange vehicle body panel and an edge of a window panel mounted on the body panel flange by a curable adhesive. The molding is a C-shaped channel member of plastic material fitted onto the edge of the window panel and having spaced apart outer and inner legs which forcibly grip the opposed outer and inner faces of the window panel. The channel member receives a bead of adhesive by which the channel member is adhesively mounted onto the window panel. A continuous flexible lip is extruded integral with the channel member and extends therefrom in a direction coplanar with the outer surface of the window panel and is effective upon mounting of the window panel upon the the body panel flange by the curable adhesive to bridge across the space between the window panel and the body panel. A continuous foot is extruded integral with the inner leg of the channel member and adapted to seat within the curable adhesive adhering the window panel to the body panel flange so that the adhesive surrounds the foot and thereby mechanically retains the lower leg of the molding onto both the window panel and the body panel independently of the bead of adhesive within the channel member to thereby further anchor the molding against being dislodged from the vehicle body.

1 Claim, 1 Drawing Sheet

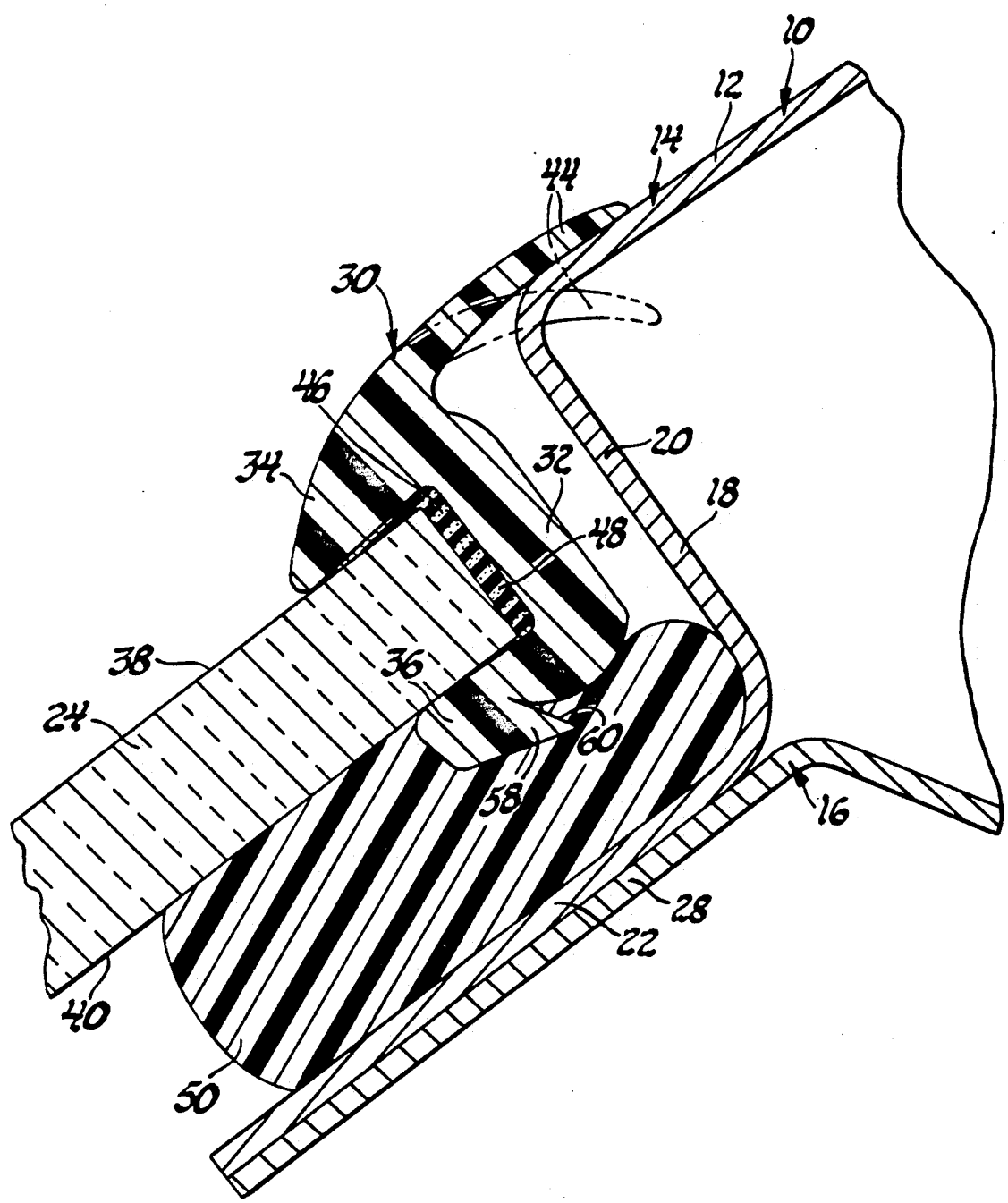

WINDOW REVEAL MOLDING

The invention relates to a window reveal molding for a motor vehicle body and more particularly to a decorative molding for concealing a space between a vehicle body panel and a window panel adhesively secured in a flanged opening of the vehicle body.

BACKGROUND OF THE INVENTION

It is known to conceal the space between a window panel and vehicle body panel by use of a metal molding which bridges the space and is attached to the vehicle body by a plurality of clips spaced along the length of the molding and engaged on studs welded to the body panel.

It is also known to provide a plastic extruded molding having a decorative portion which overlies the window panel and the body panel and is inserted into a bead of curable adhesive to attach the molding to the body panel and the glass. An example of such a window reveal moldings includes U.S. Pat. No. 4,165,119, Hedeen et al, "Window Reveal Molding".

It is also known to provide a C-shaped reveal molding which is mounted on the edge of the window panel prior to the window panel being installed in the vehicle body and independently of the adhesive which adheres the window panel to the vehicle body, such as in U.S. Pat. No. 4,765,673, Frabotta et al, "Windshield Reveal Molding". A preferred material for the window reveal molding is polyvinylchloride. A preferred curable adhesive for attaching the window panel to the vehicle body is a urethane adhesive. A shortcoming of such a construction is that the urethane may not tenaciously bond to the polyvinylchloride so that the retention of the molding on the vehicle depends entirely upon a mechanical and adhesive attachment of the molding to the window panel.

It would be desirable to provide a C-shaped molding construction which could be premounted on the edge of the window panel but would be effectively adhered to the curable urethane which mounts the window panel to thereby provide a tenacious connection between the reveal molding, the window panel, and the body panel.

SUMMARY OF THE INVENTION

A vehicle window molding installation includes a molding concealing a space between a flanged vehicle body panel and an edge of a window panel mounted on the body panel flange by a curable adhesive. The molding is a C-shaped channel member of plastic material fitted onto the edge of the window panel and having spaced apart outer and inner legs which forcibly grip the opposed outer and inner faces of the window panel. The channel member receives a bead of adhesive by which the channel member is adhesively mounted onto the window panel. A continuous flexible lip is extruded integral with the channel member and extends therefrom in a direction coplanar with the outer surface of the window panel and is effective upon mounting of the window panel upon the body panel flange by the curable adhesive to bridge across the space between the window panel and the body panel and overlie the body panel. A continuous foot is extruded integral with the inner leg of the channel member and adapted to seat within the curable adhesive adhering the window panel to the body panel flange so that the adhesive surrounds the foot and thereby mechanically retains the lower leg of the molding onto both the window panel and the body panel independently of the bead of adhesive within the channel member to thereby further anchor the molding against being dislodged from the vehicle body.

BRIEF DESCRIPTION OF THE DRAWING

These and other features, objects and advantages of the invention will become apparent upon consideration of the specification and the appended drawing showing a cross section through a window reveal molding according to the invention and installed upon a vehicle body.

DESCRIPTION OF THE PREFERRED EMBODIMENT

Referring to the drawing, it is seen that a vehicle body 10 includes a conventional roof structure 12 defined by an outer panel 14 and an inner panel 16. The outer panel 14 includes an inwardly offset flange structure 18 including an inwardly extending wall 20 which is perpendicular to the surface of the outer panel 14 and a parallel extending wall 22 which extends generally forwardly and parallel to the window panel 24 and the surface of the outer panel 12. The roof inner panel 16 has a wall 28 which abuts with the wall 22 of the outer panel 14 and is pinch welded thereto. The roof pillars at each side of the window panel 24 each have similar inwardly offset flanges.

A window reveal molding, generally indicated at 30, is provided to conceal the space between the window panel 24 and the flange structure 18. The reveal molding is extruded polyvinylchloride, or other suitable plastic, and includes a C-shaped channel member having a base wall 32, an outer leg 34, and an inner leg 36. The spacing between the legs 34 and 36 is somewhat less than the thickness of the window panel 24 so that the outer leg 34 will engage with the outer face 38 of the window panel 24 and the inner leg 36 will engage with the inner face 40 of the window panel 24. The reveal molding 30 also includes an integrally extruded continuous flexible lip portion 44 which extends outwardly from the outer leg 34 as shown in the phantom line indicated position in the drawing.

The reveal molding 30 is applied to the window panel 24 prior to the window panel 24 being installed in the window opening. This installation of the reveal molding 30 to the window panel 24 may be made by the window panel manufacturer, or the molding may be applied to the edge of the window panel in the automobile assembly plant. In either case, the molding 34 is installed on the edge of the window panel 24 by spreading the legs 34 and 36 and pushing the molding on to the edge of the window panel. In addition, as seen in the drawing, the cavity 46 defined between the edge of the window panel 24 and the base wall 32 of the reveal molding preferably contains a suitable bonding and sealing material such as a butyl adhesive 48. Accordingly, it will be understood that the reveal molding 30 is effectively attached to the window panel 24 by an interference fit of the legs 34 and 36 against the inner and outer faces of the window panel 24. Furthermore, the presence of the bonding and sealing butyl adhesive 48 in the cavity 46 further attaches the molding 30 to the window panel 24.

The window panel 24 is installed in the window opening of the vehicle body and attached to the flange 20 by a bead of curable urethane adhesive 50. Upon the installation of the window panel 24, the flexible lip portion 44 is flexed and overlies and engages the face of the outer panel 14 as shown in the solid line indicated position of the drawing.

It seen that the reveal molding 30 is adjustable in the sense that the extent to which the window panel 24 is pushed toward the inside of the vehicle will cause further flexure of the flexible lip portion 44. The lower leg 36 of the reveal molding 30 has a foot portion 58 integrally extruded therewith and defined by crevasse 60 in the leg 36. The crevasse 60 is angled away from the intersection of the inwardly extending wall 20 and the parallel extended wall 22 the flange structure 18. The curable adhesive 50 enters the crevasse 60 so that the adhesive surrounds the foot 58 to mechanically retain the lower leg 58 to assist in retaining the windshield reveal molding 30. Accordingly, although the bead of urethane 50 may not have a tenacious bond with the lower leg 36 of the PVC molding 30, the foot 58 becomes mechanically embedded in the bead of cured adhesive 50 so that the foot 58 is anchored and the reveal molding 30 is substantially anchored against being rotated out of its installed position shown in the drawing.

Accordingly, the adhesive seal and bond provided by the butyl adhesive 46 provided in the cavity 46 is supplemented by the mechanical connection between the foot 58 of the reveal molding 30 and the bead of cured urethane adhesive 50 so that the reveal molding is effectively anchored against being dislodged from the vehicle body by the spring-like influence of the continuous lip portion 44 which bears against the outer panel 12 and tends to rotate the molding 30.

Thus it is seen that the invention provides a new and improved window reveal molding having a foot mechanically anchored in bead of adhesive to resist rotary dislodgment of the window reveal molding from the vehicle body.

The embodiments of the invention in which an exclusive property or privilege is claimed are defined as follows:

1. A motor vehicle window molding installation having a molding concealing a space between an inwardly extending wall of a flanged vehicle body panel and an edge of a window panel, with the edge of the window panel overlying a parallel extended wall intersecting the inwardly extending wall of the flanged vehicle body panel and mounted on the parallel extended wall of the flanged vehicle body panel by a curable adhesive, the molding comprising:

a C-shaped channel member of plastic material fitted onto the edge of the window panel and having spaced apart outer and inner legs which forcibly grip the opposed outer and inner faces of the window panel, said channel member being adapted to receive a bead of adhesive by which the channel member is adhesively mounted onto the window panel, a continuous flexible lip extruded integral with the channel member and adapted upon mounting of the window panel upon the body panel flange by the curable adhesive to bridge across the space between the window panel and the body panel thereby flexing and overlying the body panel and bearing upon the body panel exerting a spring-like influence tending to rotate the molding, and the inner leg having a continuous foot extruded integral therewith, and defined by a crevasse formed in the inner leg underlying the inner face of the window panel and extending angularly away from the intersection of the inwardly extending wall and the parallel extended wall of the body panel flange and towards the inner face of the window panel and terminating within a perimeter of the window panel, wherein the continuous foot is adapted to seat within the curable adhesive so that the adhesive surrounds the foot and enters the crevasse and thereby mechanically retains the lower leg of the molding onto the window panel and the body panel independently of the bead of adhesive within the channel member to thereby further anchor the molding against being dislodged from the vehicle body by the rotary force exerted thereon by the continuous flexible lip.

* * * * *